CALL CONTROL SYSTEM FOR A RADIOCOMMUNICATION NETWORK

Filed Oct. 31, 1967

United States Patent Office 3,551,815

Patented Dec. 29, 1970

3,551,815

CALL CONTROL SYSTEM FOR A RADIO-COMMUNICATION NETWORK

Leon Berman, Asmieres, France, assignor to C.I.T.-Compagnie Industrielle des Telecommunications, Paris, France, a corporation of France Filed Oct. 31, 1967, Ser. No. 679,411
Claims priority, application France, Nov. 5, 1966, 82,681
Int. Cl. H04b 1/16
U.S. Cl. 325—55 10 Claims

ABSTRACT OF THE DISCLOSURE

A radio communication network, wherein a given subscriber is selectively called by means of a specific number of equally spaced pulses which are transmitted in the form of a pulse train. The said pulses are received by a counter with a specific numerical display. The called device is driven by means of a coincidence of the first pulse of the train after passing a specific delay network, with a pulse which is transmitted by the counter after receiving the last pulse of the train.

The present invention is directed to a method and a device for effecting selective calling or ringing in a multichannel communication system, and in particular in radio links transmitting a call in the form of a train of pulses, the invention offering a high degree of protection against incorrect calls which may be caused by interference.

In radio links between several participating stations forming a network, it is known to transmit a call by way of ringing signals in the form of trains of pulses, all of the pulse trains having the same total duration. This duration, of constant value for all calling or ringing codes, is subdivided into a fixed number of elementary intervals, each of which may comprise a pulse or not, for example, according to a code system of the binary type which renders it possible to express all the numbers from zero to $2^n—1$ with $n$ elementary intervals which may or may not be occupied by pulses.

This known system renders it possible to direct a selective call signal intended for a predetermined participant chosen from a great number of participants. However, the disadvantage of the known system is that it is very sensitive to interference. In point of fact, an interference source, even at low signal strength, may have a noise level equal to that of a code pulse after amplification and passage through a limiter. It is plain therefore, that in a coding system comprising pulse positions and space positions formed by the absence of a pulse, an interference signal may cause a pulse to incorrectly appear instead of a gap, or vice versa, thus resulting in an incorrectly directed call.

In order to eliminate this disadvantage, the invention employs a coding system comprising trains of pulses of different lengths without space positions, and means for establishing correspondence between the duration of a train of code pulses as a function of the numerical value represented and a characteristic period of delay attributed to a particular participant. If the number of participants is great, the code comprises several trains of pulses, for example, representing successive decimal positions.

According to the invention, a selective calling or ringing system comprising a code formed by at least one train of pulses variable in number and uniformly spaced apart, is characterized in that the receiver of a participating station contains, on the one hand, a delaying circuit characteristic of the said station, and on the other hand, a fixed rating divider, both characteristic of the said station, means for applying the received code pulses to the delaying circuit and to the divider, and a coincidence circuit adapted to emit a signal if the first pulse of the delayed train issuing from the said delaying circuit coincides with the pulse emitted by the said fixed rating divder or the like.

It is therefore an object of the present invention to provide a call control system for radiocommunication network, or the like, which eliminates or otherwise materially avoids the difficulties and disadvantages inherent in known arrangements of a similar nature.

It is another object of the present invention to provide a call control system of the type described which is capable of preventing erroneous calls due to undesirable interference.

It is a further object of the present invention to provide a call control system of the type described which is capable of accommodating a plurality of stations in a simplified and efficient manner.

It is still another object of the present invention to provide a call control system of the type described which is effective in abandoning a call which is incorrectly established or corrupted due to undesirable interference.

These and other objects, features and advantages will become apparent from the following detailed description of the invention when taken in conjunction with the following drawings which illustrate exemplary embodiments of the invention, and wherein.

Figure 1:
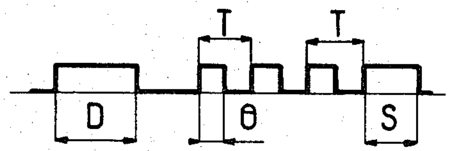
FIG. 1 illustrates a single train of code pulses fed to the input of the device according to the invention.

In FIG. 1, there is illustrated a single calling train of pulses, which pulse train comprises an initial pulse of a definite duration equal to D, $n$ identical pulses having a duration $\theta$ each, which duration $\theta$ is shorter than the duration D, and a final pulse of a duration S, intermediate between the durations $\theta$ and D. It is apparent in this figure that the final pulse having the duration S forms part of the calling code, the time T separating two rising fronts of two adjacent pulses having the duration $\theta$ being the same as that separating the rising fronts of the pulse having the duration S and the preceding pulse having the duration $\theta$.

As a modification, the last pulse may be displaced relative to the preceding pulse having the duration $\theta$ in such manner that it is no longer decoded as a code pulse but solely as a final pulse extraneous to the calling code.

Figure 2:
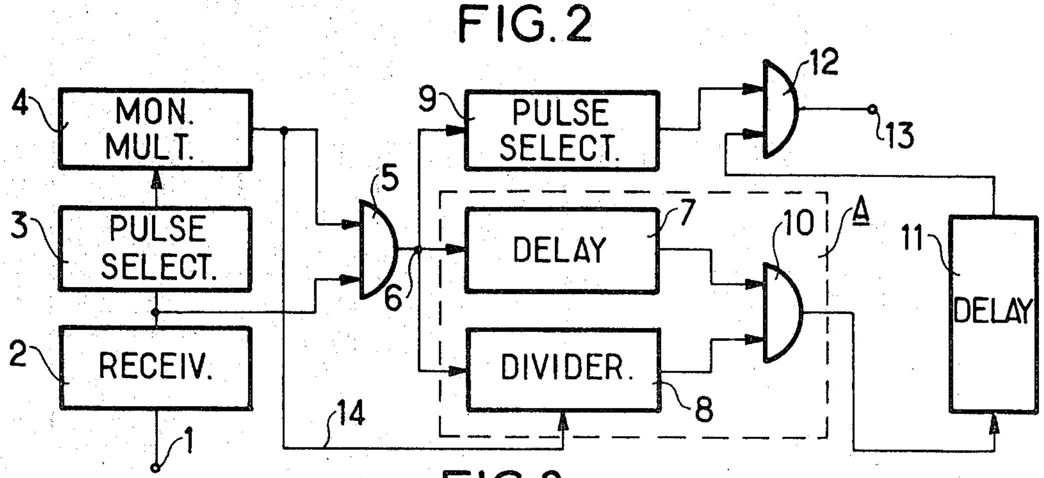
FIG. 2 illustrates a selective calling or ringing device in accordance with the present invention in which the call is transmitted according to FIG. 1.

In FIG. 2, the calling signal illustrated in FIG. 1 is transmitted in the form of pulses to a terminal 1 of a receiver 2. The output of the receiver 2 is connected, on the one hand, to a pulse duration selector element 3 tuned to a duration D of an initial pulse to be detected, and on the other hand, to a first input of an AND circuit 5 whose second input is connected to the output of a monostable circuit 4, which has its input connected to the output of the selector element 3. The output of the AND circuit 5 is connected at 6 to the input terminal of a comparison circuit A formed by a delay element 7 of adjustable delay $\tau$ and a divider element 8 whose rating or degree $n$ is variable and displayable, the outputs of which are connected, respectively, to the two inputs of a second AND circuit 10. The input terminals of the device 7 establishing the delay $\tau$ and of the divider element 8 of displayable rating $n$, are conjointly connected to the input terminal 6 of the comparison circuit A, and the output of the AND circuit 10 forms the output terminal of the comparison circuit A. The terminal 6 is also connected to the input of a second pulse duration selector element 9 set to a duration S of a code termination pulse to be detected, the duration S being intermediate between the duration D of the initial pulse and the duration $\theta$ of a code pulse. The output of the second selector element 9 is connected to a first input of an AND circuit 12. The output of the AND circuit 10 is connected through a delaying element 11 providing a delay $(S-\theta)$ to a second input of the AND circuit 12, whose output is connected to the output terminal 13 of the system.

The connection 14 between the output of the monostable circuit 4 and a second input of the divider 8 serves to reset the divider to zero at the beginning of each sequence of operation.

A system such as that illustrated in FIG. 2 is applicable in the case in which $n$ calling pulses, preferably $(n-1)$ pulses of a duration $\theta$ and a final code pulse of a duration S, form a single train of code pulses. A call signal transmitted to the terminal 1, including an initial pulse having the duration D, is fed to the duration D selection element 3. Detection of a pulse of duration D results in transmission of a pulse monostable circuit 4 which switches over and opens the AND circuit 5. Starting at this instant the $n$ calling pulses, any interference pulses, and the final pulse making up the call signal are allowed to pass through the AND circuit 5. These pulses are fed to the terminal 6 which injects them simultaneously into the second selector element 9, providing an output in response to receipt of the last code pulse having the duration S, into the divider element 8 responsive to $n$ pulses, $n$ being the known number of calling pulses, required to actuate this particular station in such manner that the pulse delivered at the output terminal corresponds to the $n$-th calling pulse fed to its input terminal, and into the element 7 providing a delay $\tau$. The element 7, for example, comprises a circuit producing a delay $\tau$, whose delay $\tau$ is set in such a manner that a pulse fed to the input is delayed by a time equal to the required time separating the first and the $n$-th pulse of the train of calling pulses. Thus, under proper circumstances, the output pulses of the divider 8 and of the delaying circuit 7 will appear simultaneously at the two inputs of the AND circuit 10 and will traverse the same.

By contrast, if an interference pulse has been added to the train of calling pulses, or if a calling pulse has been suppressed due to interference, the output pulses of the divider 8 and of the delaying circuit 7 will not arrive simultaneously, or not at all, and the AND circuit 10 will thus remain closed. The last calling pulse having the duration S is detected by the element 9 selecting only pulses of a duration S, which element 9 feeds a pulse to an input of the AND circuit 12. The output pulse of the AND circuit 10 traverses a delay element 11, for example, a delaying circuit providing a delay equal to the difference between the duration S and the duration $\theta$, being the known difference $(S-\theta)$, with the result that the said output pulse of the AND circuit 10 is delayed in such manner as to be fed to an input of the AND circuit 12 at the same time as the pulse detected in the selector element 9 fed to the other input of the AND circuit 12. It is plain therefore that an actuating calling pulse will be fed to the terminal 13 only in case of coincidence at the output of the receiver between the call combination transmitted by a transmitter. If an interference pulse is present in the calling code, the call will be cancelled, so that an incorrect call cannot be accepted at the given station.

Figure 3:
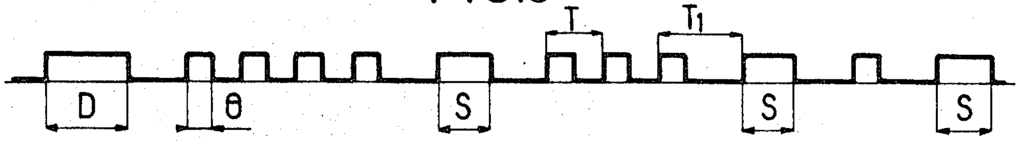
FIG. 3 illustrates a call signal which is coded and applied in the form of several trains of pulses.
Figure 4:
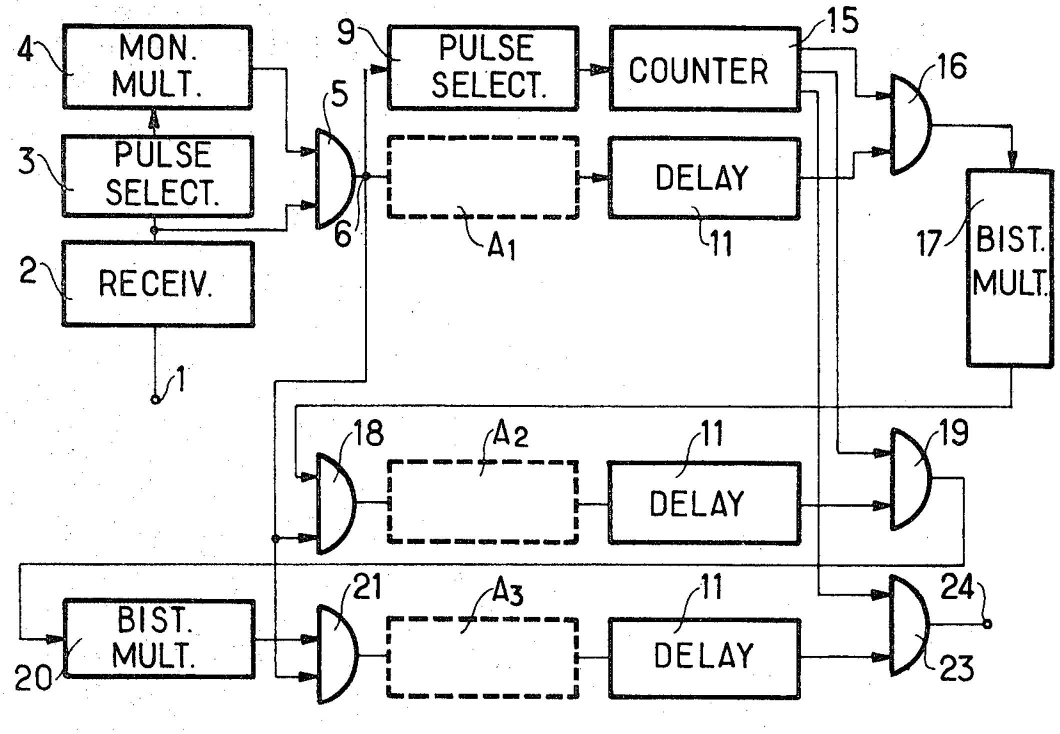
FIG. 4 illustrates a selective calling device in accordance with the present invention in which the call is transmitted in the form of several call trains of pulses according to FIG. 3.

FIG. 4 is a layout of a selective calling device in which a decimally coded call signal is employed in the form of several trains of calling pulses, in the manner shown by way of example in FIG. 3.

FIG. 3 illustrates a code comprising three decimal figures, for example 431. The call signal consists of an initial pulse having the duration D, of a first train of $n_1$ pulses, $n_1$ being equal in number to 4 and the pulses being of uniform level and constant duration $\theta$, of a second train of $n_2$ pulses identical to the preceding pulses $n_1$ and $n_2$ being equal in number to 3. The train of $n_2$ pulses are separated from the first train of $n_1$ pulses by a first dividing pulse having the duration S, and are separated by a second dividing pulse having the duration S from a third train of $n_3$ pulses, identical to the preceding pulses $n_2$ and $n_3$ and equal in number to 1. The call signal also includes a final pulse which has the duration S in the case shown in the figure, each of the dividing pulses having a duration S intermediate in length between the duration D and the duration $\theta$. According to the illustration shown in FIG. 3, it is apparent that a pulse having the duration S separated from a pulse having the duration $\theta$ by a time $T_1$ longer than the time T separating two pulses having the duration $\theta$, does not form part of the code and is not counted as a code pulse.

In FIG. 4, the output terminal 6 of the AND circuit 5 is connected to the input of the pulse duration selector element 9 tuned to a duration S corresponding to the pulses illustrated in FIG. 3, to the input of a first comparison element $A_1$, identical to the comparison element A shown in FIG. 2, and to a first input of the AND circuits 18 and 21, respectively. The output of each of the AND circuits 18 and 21 is connected to the input of a comparison element $A_2$ and $A_3$, respectively. Each of the aforesaid comparison circuits $A_1$, $A_2$ and $A_3$ has an output connected, respectively, to the input of a monostable circuit 11 connected to a first input of an AND circuit 16, 19 and 23, respectively. The pulse duration selector element 9 has an output connected to the input of a counter 15 for counting pulses having the duration S, and includes N outputs connected respectively to a second input of the AND circuits 16, 19 and 23, N being equal to the number of pulses having the duration S provided in the signal. The output of the AND circuit 16 is connected through a bistable circuit 17 to a second input of the aforesaid AND circuit 18; analogously, the output of the AND circuit 19 is connected through a bistable circuit 20 to a second input of the aforesaid AND circuit 21. The output of the AND circuit 23 is connected to an output terminal 24 of the selective calling device.

In FIG. 3, it is evident that the number of decades separated by the dividing pulses having a duration S, may be greater than that illustrated, and the layout according to FIG. 4 may, as a consequence of the number of decades, equally comprise other comparison elements A inserted in a manner analogous to the element $A_2$.

It will be understood that in a code of three decimal figures, such as that illustrated in FIG. 3, it is possible to form one thousand calling codes, subject to the condition that the figure 0 should be represented in each decade by ten pulses of uniform level identical to the $n_1$, $n_2$ or $n_3$ pulses cited in the foregoing.

The arrangement according to FIG. 4 operates in the following manner: the input pulses fed to the terminal 1 being illustrated in FIG. 3, the initial pulse having the duration D is detected by the selector 3 tuned to the duration D, the monostable circuit 4 is thereby switched over for a period slightly longer than the longest code possible, the AND circuit 5 opens and the pulses following the initial pulse are fed to the terminal 6.

The first train of $n_1$ pulses is recognized in the element $A_1$, in which the degree of division of the dividing element analogus to the element 8 of FIG 2, is set up equal to $n_1$, and the time $\tau$ of the element analogous to the delaying element 7 of FIG. 2 is such that the first pulse of the train is transmitted to an input of the AND circuit 10 (see FIG. 1) at the same time as the $n$th pulse counted in the divider. The AND circuit 10 triggers the delaying circuit 11 which renders it possible to await detection of the following S pulse.

When the S duration detector 9 has detected the first S pulse, the counter 15 is advanced to a first count energizing AND gate 16, and by establishing coincidence at the AND circuit 16 between this circuit 11, triggers the bistable switching element 17.

The bistable switching element 17 opens the AND circuit 18 which receives the pulses from the terminal 6 at its other input, the system $A_2$ detects a number $n_2$ of pulses of the second train, and when the counter 15 counts a second pulse S, it establishes coincidence at the circuit 19 of this output and the output of the circuit $A_2$ by means of the delay circuit 11. This will occur for each train of pulses, the output of the final comparison circuit $A_3$ in FIG. 4 and the output of the terminating pulses coinciding at the AND circuit 23, triggering the call.

It is clearly apparent that when an interference pulse appears, added to one of the trains of $n_1$, $n_2$ or $n_3$ pulses, or else in the case of the accidental disappearance of a pulse due to interference, there will not be any coincidence between the two items of information fed, respectively, to the corresponding AND circuit 16, 19 or 23, and in consequence, transmission of the call will be interrupted; the call will be wasted, but there will be no incorrect call received.

In case of a wasted call, the calling operation may be repeated until the connection is obtained, whereas an incorrect call leads to a pointless and troublesome result.

In each comparison element, it is apt to note that the delay and degree of division are adjusted as a function of the code of a decade corresponding to a particular comparison element of the subscriber called.

I have shown and described two embodiments in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

What is claimed is:

1. A call control system responsive to trains of code pulses variable in number and regularly spaced apart, including a plurality of receiver stations each responsive to a pulse train consisting of a particular number of code pulses, each receiver station comprising:

first delay means responsive to a received train of code pulses for delaying said code pulses for a duration equal to that occupied by the number of code pulses particular to the respective receiver station, counting means responsive to a received train of code pulses for providing an output after receipt of the number of code pulses particular to the respective station, coincidence means actuated upon detection of coincident outputs from said first delay means and said counting means, and control means for providing a control output signal in response to detection of coincidence between actuation of said coincidence means and receipt of the last code pulse of said received pulse train.

2. A system as defined in cliam 1 wherein each train of code pulses is preceded by an initial pulse of increased duration, each receiver station further comprising a receiver section for detecting initial receipt of a train of code pulses through detection of said initial pulse.

3. A system as defined in claim 2 wherein said receiver section comprises a first pulse duration detector for detecting said initial pulse by its increased duration, and first gating means responsive to said first pulse duration detector for applying said train of code pulses to said first delay means and said counting means.

4. A system as defined in claim 2 wherein each train of code pulses is followed by an end pulse of duration greater than said code pulses and less than said initial pulse, said control means including a second pulse duration detector for detecting said end pulose by its duration and generating a gating signal indicating the end of said train of code pulses.

5. A system as defined in claim 4 wherein said control means further includes second delay means for delaying the output of said coincidence means for an interval equal to the difference in duration between a code pulse and said end pulse, and second gating means connected to said second delay means and said second pulse duration detector for providing said control output signal upon coincident receipt of said gating signal and an output from said second delay means.

6. A system as defined in claim 4 wherein each train of code pulses is made up of at least two groups of code pulses separated by an end pulse, said first delay means, counting means and control means forming a first coincidence combination for receiving the first group of code pulses, at least one additional coincidence combination connected to the output of said first coincidence combination for receiving the second group of code pulses in response to generation of a control output signal by said first coincidence combination.

7. A system as defined in claim 6 further including selection means connected to said second pulse duration detector for successively energizing the control means for said first and second coincidence combinations in response to detection of successive end pulses by said second pulse duration detector.

8. A system as defined in claim 7 wherein an AND gate is connected to the input of said second coincidence combination and having one input connected to the output of said first coincidence combination, said train of code pulses being applied simultaneously to the input of said first coincidence combination and a second input of said AND gate.

9. A system as defined in claim 1 wherein said counting means is provided in the form of a divider and producing an output for each *n* pulses received, *n* being a number characteristic of the respective receiver station.

10. A system as defined in claim 9 wherein said coincidence means is provided as an AND gate having respective inputs connected to said divider and said first delay means and an output connected to said control means.

References Cited

UNITED STATES PATENTS

| | | | |
|---|---|---|---|
| 2,955,279 | 10/1960 | Bode et al. | 179—84X |
| 3,004,241 | 10/1961 | Konig | 179—84X |
| 3,114,142 | 12/1963 | Bode et al. | 325—55 |
| 3,226,680 | 12/1965 | Koller et al. | 340—167 |

ROBERT L. RICHARDSON, Primary Examiner

U.S. Cl. X.R.

179—41; 325—64; 340—164